US009310740B2

(12) United States Patent
Yamanishi et al.

(10) Patent No.: US 9,310,740 B2
(45) Date of Patent: Apr. 12, 2016

(54) IMAGE FORMING APPARATUS, ENERGY SAVING CONTROL METHOD, AND MEDIUM

(71) Applicants: Fumitake Yamanishi, Kanagawa (JP); Yoshitaka Komine, Kanagawa (JP); Takahiro Aso, Tokyo (JP); Kohji Fujinaga, Tokyo (JP)

(72) Inventors: Fumitake Yamanishi, Kanagawa (JP); Yoshitaka Komine, Kanagawa (JP); Takahiro Aso, Tokyo (JP); Kohji Fujinaga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/778,789

(22) Filed: Feb. 27, 2013

(65) Prior Publication Data

US 2013/0243467 A1 Sep. 19, 2013

(30) Foreign Application Priority Data

Mar. 15, 2012 (JP) ................................. 2012-058200

(51) Int. Cl.
*G06F 3/12* (2006.01)
*G03G 15/00* (2006.01)

(52) U.S. Cl.
CPC .................................. *G03G 15/5004* (2013.01)

(58) Field of Classification Search
CPC .................................................. G03G 15/5004
USPC ........................ 399/75; 358/1.13, 1.114, 1.15
See application file for complete search history.

(56) References Cited

U.S. PATENT DOCUMENTS

| | | | | |
|---|---|---|---|---|
| 2006/0236143 | A1* | 10/2006 | Kidoguchi | 713/320 |
| 2006/0274348 | A1* | 12/2006 | Suzuki | 358/1.13 |
| 2011/0040992 | A1 | 2/2011 | Mizunashi | |
| 2011/0051166 | A1* | 3/2011 | Nishikawa | 358/1.13 |
| 2012/0331236 | A1* | 12/2012 | Kikuta et al. | 711/143 |

FOREIGN PATENT DOCUMENTS

| | | |
|---|---|---|
| CN | 1842028 A | 10/2006 |
| JP | 2010-160550 | 7/2010 |
| JP | 2011-041152 | 2/2011 |
| JP | 2011-142577 | 7/2011 |
| WO | WO 2011/086744 A1 | 7/2011 |

* cited by examiner

*Primary Examiner* — Kent Yip
(74) *Attorney, Agent, or Firm* — Oblon, McClelland, Maier & Neustadt, L.L.P.

(57) ABSTRACT

An image forming apparatus includes a UI application that configures functions supported in an energy saving mode and in a normal mode, an energy saving memory control service that manages settings of the configured functions supported in the energy saving mode, and a filtering service that filters external access to the image forming apparatus in the energy saving mode along with the settings. In the energy saving mode, the filtering service determines whether the image forming apparatus remains in the energy saving mode or returns to the normal mode in order to process the access using the settings.

9 Claims, 10 Drawing Sheets

500

500

IMAGE FORMING APPARATUS, ENERGY SAVING CONTROL METHOD, AND MEDIUM

CROSS-REFERENCE TO RELATED APPLICATION

This patent application is based on and claims priority pursuant to 35 U.S.C. §119 to Japanese Patent Application No. 2012-058200, filed on Mar. 15, 2012 in the Japan Patent Office, the entire disclosure of which is hereby incorporated by reference herein.

BACKGROUND

1. Technical Field

The present invention relates to an image forming apparatus, energy saving control method, and medium, and more particularly to an image forming apparatus that facilitates controlling providing functions in energy saving mode.

2. Background Art

Image forming apparatuses that include a thermal fusing process as an image forming process, such as multi functional peripherals (MFPs) and laser printers whose power consumption is relatively large, are equipped with energy saving mode in order to reduce their poser consumption. In energy saving mode, an apparatus on standby reduces power consumption by stopping supplying the power to functional units such as a CPU, a charging unit, and a fuser roller.

If an image forming apparatus on standby transitions to energy saving mode in order to reduce power consumption, overall power consumption can be minimized. Sometimes MFPs that include multiple functions such as copier, scanner, facsimile, and network communications function receive requests via a network in energy saving mode, and MFPs are available to respond to accesses via a network occasionally even if they are in energy saving mode.

Conventionally, a technology of setting up a device that responds only in energy saving mode to support response to network communication has been proposed. For example, a technology of determining whether or not an image forming apparatus transitions from normal mode to energy saving mode in order to transition to energy saving mode appropriately and refusing to respond to request to execute a job after the image forming apparatus has transitioned to energy saving mode has been proposed (e.g., JP-2011-142577-A.)

It is possible to transition to energy saving mode efficiently in the technology described in JP-20111-142577-A. However, the technology described in JP-20111-142577-A is incomplete since it limits usage of an image forming apparatus by users, and the functions available in energy saving mode are fixed. Therefore, it is not enough to support diversified functions and diversified usage.

SUMMARY

The present invention provides an image forming apparatus, energy saving control method, and medium that improves usefulness of energy saving mode by making it possible to configure functions of image forming apparatus available to respond in energy saving mode.

More specifically, the present invention provides an image forming apparatus that implements normal mode in which the power to provide all functions of the image forming apparatus is supplied and energy saving mode in which the power is supplied to some parts of the image forming apparatus. Also, the image forming apparatus includes a configuring unit that configures functions supported maintaining energy saving mode in normal mode and a management unit that manages settings of the configured functions supported in energy saving mode. Also, the image forming apparatus includes a filtering unit that filters accesses to the image forming apparatus from outside in energy saving mode along with the settings, and the filtering unit determines whether it maintains energy saving mode or it recovers to normal mode in order to process the access using the configured settings. In the image forming apparatus, the configuring unit that configures functions supported maintaining energy saving mode further includes a specifying unit that specifies the maximum power consumed in energy saving mode, chooses the most appropriate function that can be provided within the specified maximum power, and displays the function on a configuration screen. Also, the image forming apparatus includes a monitoring unit that monitors usage rate of a storage unit while transitioning to energy saving mode and modifies memory allocation in the storage unit in response to usage rate of the storage unit in energy saving mode.

The storage unit includes a plurality of storage units in various memory sizes, and the image forming apparatus modifies memory allocation to supply the power to additional storage unit in case usage rate of the default storage unit exceeds setting during the energy saving mode. The default storage unit has the minimum size among the plurality of storage units, and usage efficiency and process efficiency of the storage unit in energy saving mode can be modified by allocating memory.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
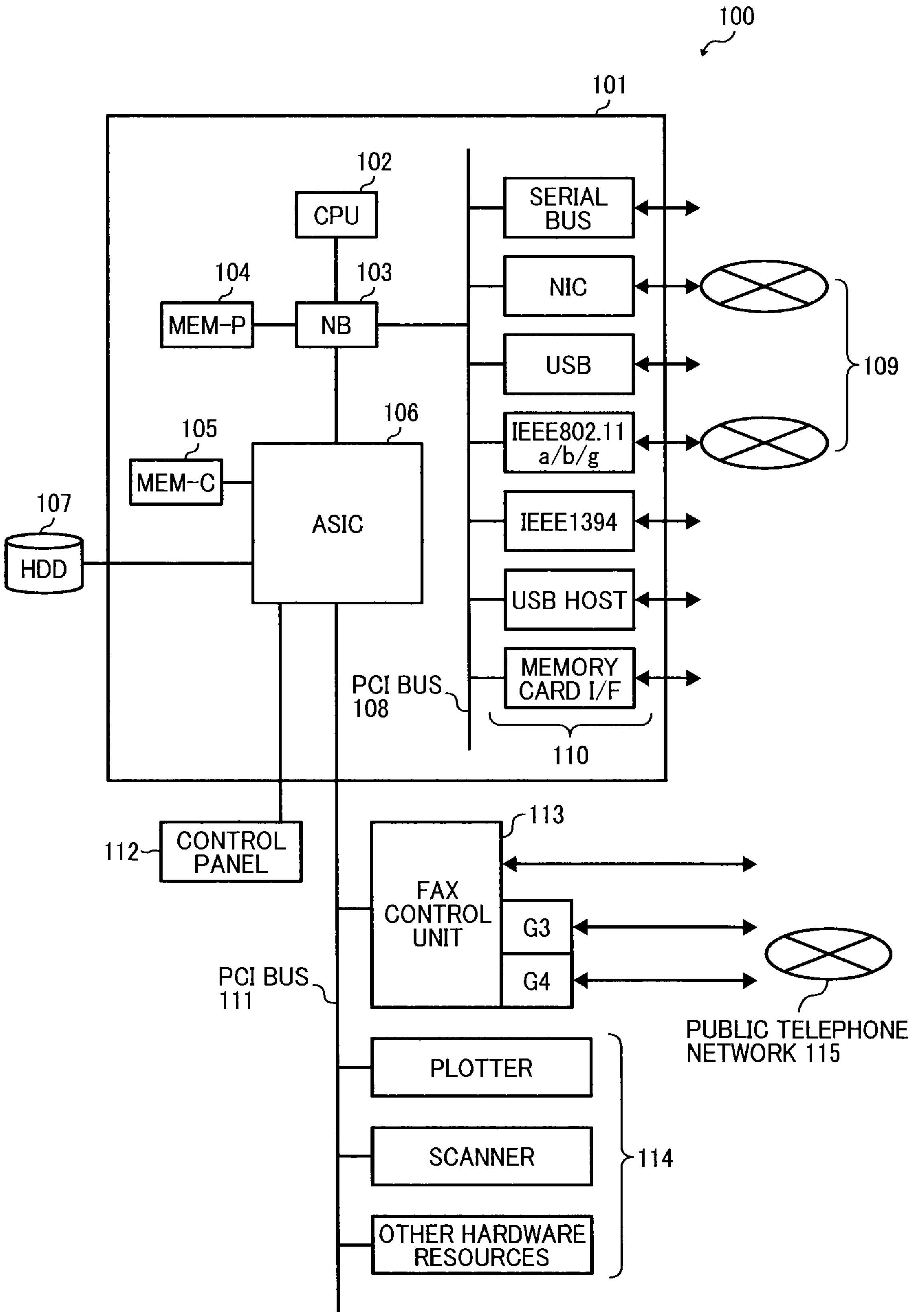
FIG. 1 is a diagram illustrating a hardware configuration of an image forming apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

FIG. 1 is a diagram illustrating hardware configuration of an image forming apparatus 100 of the present invention. The image forming apparatus 100 is implemented as a MFP that provides multiple functions and includes a controller 101, a control panel 112 controlled by the controller 101, a facsimile control unit 113, and functional units 114 such as various engines and hardware resources. The controller 101 includes a CPU 102, and the CPU 102 runs an operating system (OS), executes application programs, and has the image forming apparatus 100 function as various functional units. Although the OS is not specified, Linux is one possible OS.

The CPU 102 is connected to a process memory 104 via a NorthBridge (NB) 103 and executes the OS and various applications. The NB 103 includes a PCI bus host and controls data communication among various devices 110 via a PCI bus 108. Also, the controller 101 includes an ASIC 106 as a SouthBridge and executes data communication with storage device 105 such as memory like NVRAM and a Hard Disk Drive (HDD) 107.

The ASIC 106 controls the control panel 112 installed on the main body of the image forming apparatus via an appropriate bus such as a serial bus or a parallel bus, receives commands from the control panel 112, and has the CPU 102 execute appropriate processes. The control panel 112 includes a LCD panel and provides a UI. Also, the ASIC 106 includes a PCI bus bridge (not shown in figures), controls the facsimile control unit 113 and functional units 114 such as various engines like a plotter unit and a scanner unit and other hardware resources that operate as target devices, and executes data communication with them.

The facsimile control unit 113 includes an engine that provides a facsimile function and provides facsimile service via a public telephone network and internet, using communications protocol such as G3 and G4. The plotter means an electrophotographic image forming engine that executes printing of various data. The scanner scans a document image mounted on a document bed using devices like a CCD array and generates digital data that can be processed by the facsimile engine and the plotter engine and stored in a data storage device.

Figure 2:
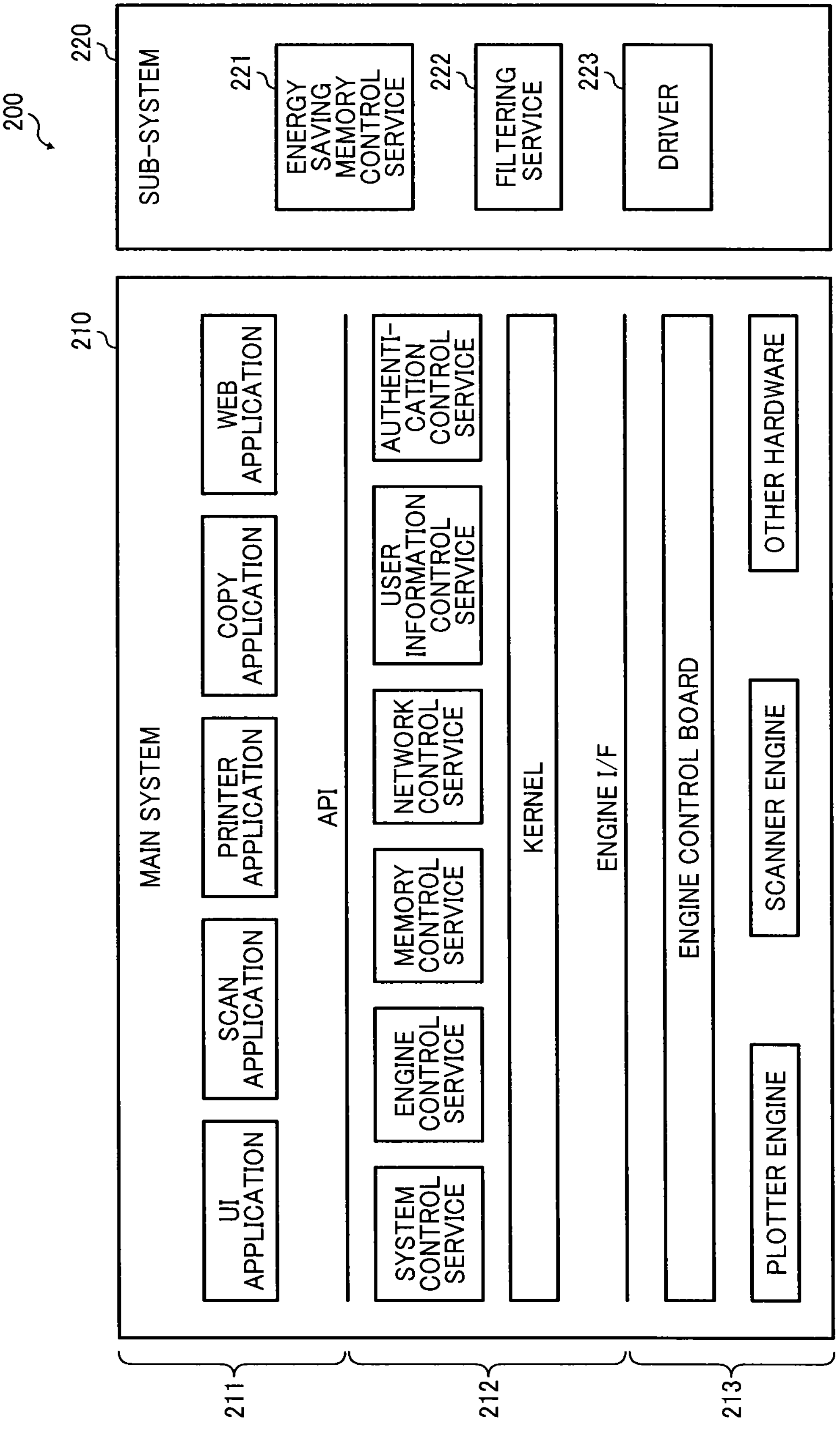
FIG. 2 is a functional block diagram of the image forming apparatus as an embodiment of the present invention.

FIG. 2 is a functional block diagram 200 of the image forming apparatus 100. The image forming apparatus 100 includes a main system 210 and a sub-system 220. The main system 210 provides main functions of the image forming apparatus 100, and the sub-system 220 manages transition to/from energy saving mode of the image forming apparatus 100. The main system 210 includes an application layer 211, a middleware layer 212, and an engine layer 213. The application layer 211 includes applications such as a UI application, a scan application, a printer application, a copy application, and a Web application, and provides various functions for users via a UI provided by the UI application.

The application layer 211 passes results of various processes to the middleware layer 212 by executing data communication with the middleware layer 212 via an appropriate application program interface (API). Functions provided by the image forming apparatus 100 are implemented in the middleware layer 212. The middleware layer 212 receives commands and passes them to various applications for functions such as system control service, engine control service, memory control service, network control service, user control service, and authentication. Also, the middleware layer 212 passes processed results from various applications to various engines. It should be noted that the network control service includes communications among external devices such as Ethernet and network control including PCI bus bridge.

The middleware 212 is controlled by a kernel included in the OS by using various interrupts, communicates with the engine layer 213, and controls the engine layer via an engine IT that consists of drivers etc. The engine layer 213 consists of a plotter engine, a scanner engine, a facsimile engine, and engines for other hardware such as NIC and HDD and executes input and output with outside devices such as printing, image data, facsimile communication, and internet communication.

Furthermore, the image forming apparatus 100 shown in FIG. 2 includes an energy saving management function, and the energy saving management function is implemented as a sub-system 220. The sub-system 220 includes a memory control service 221, a filtering service 222, and a driver 223 and provides functions same as the middleware layer 212.

The memory control service 221 includes a memory access control function to memories such as RAM and a power supply control function used to provide functions specified to be processed when the image forming apparatus 100 is in energy saving mode and includes energy saving memory control service that manages memory allocation in energy saving mode. In case of receiving requests from outside, the filtering service 222 screens the requests and determines whether it is OK to respond to the requests with maintaining energy saving mode or if it is necessary to wake up from energy saving mode to respond to the requests. The driver 223 shares a part of the main system 210 and is used to provide a specified function available while maintaining the main system 210 in energy saving mode. Particular examples of the driver 223 are Ethernet driver in network communication and PCI driver etc.

The image forming apparatus 100 allows response to certain specified requests while maintaining energy saving mode with configuration described above. It should be noted that a rechargeable storage battery can be used as power source of the sub-system 220, or power can be supplied only to the sub-system 220 selectively.

Figure 3:
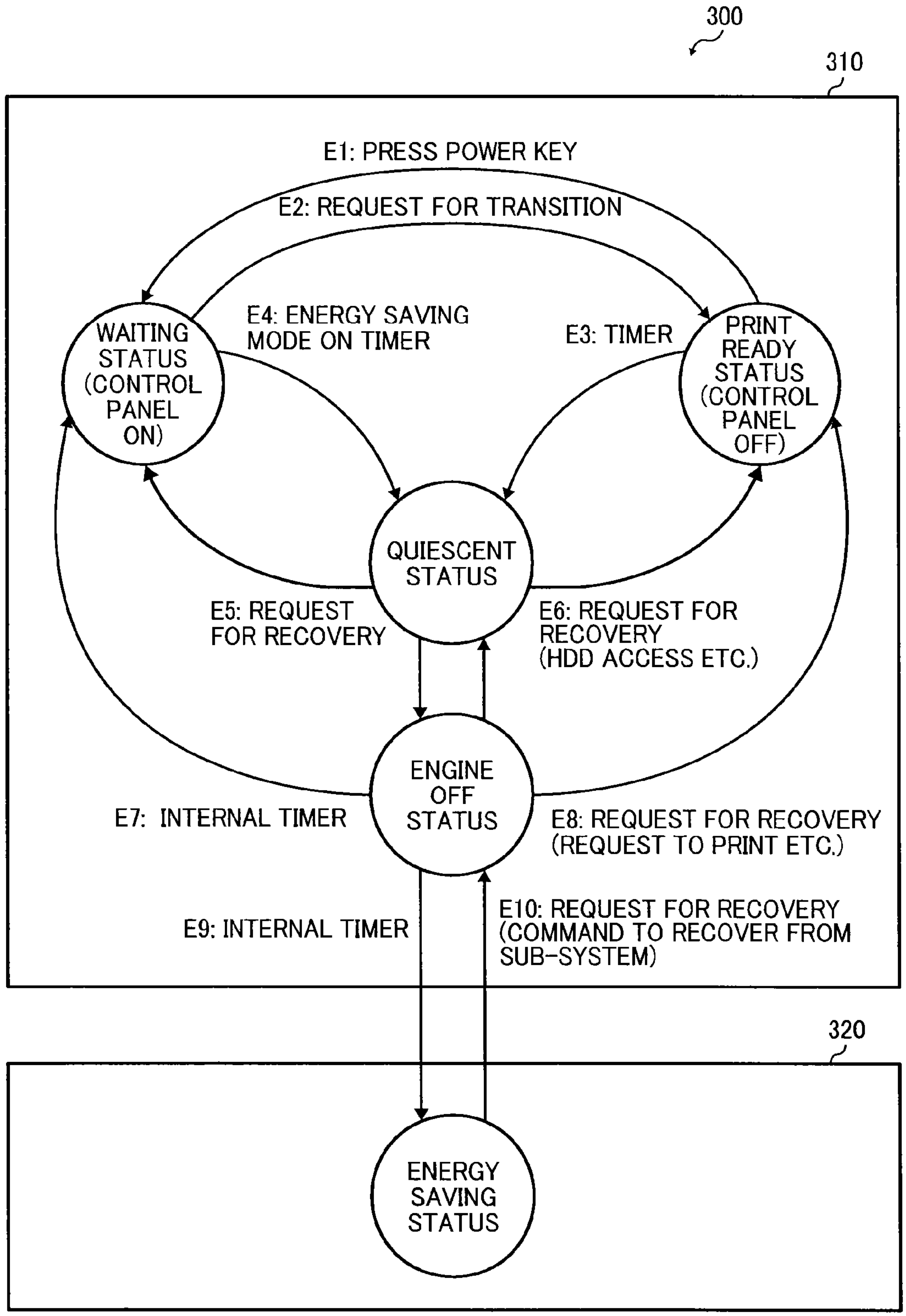
FIG. 3 is a diagram illustrating state transition of the image forming apparatus as an embodiment of the present invention.

FIG. 3 is a diagram illustrating state transition of the image forming apparatus 100. A state diagram 310 illustrates states in case the image forming apparatus 100 operates in normal mode and a state diagram 320 illustrates states in energy saving mode. In normal mode, if power is activated as an event E1, the image forming apparatus 100 transitions to waiting status (control panel on). If an event E2: request for transition is issued to the image forming apparatus 100 that is in waiting status, the image forming apparatus 100 transitions to print ready status in order to respond to requests. Contrarily, if predefined period set to a timer passes in print ready status, a timer expiration event occurs as an event E3 and the image forming apparatus 100 transitions to quiescent status.

If an event E4 such as expiration of timer to enable energy saving occurs in waiting status, the image forming apparatus 100 transitions to quiescent status. If an event E5 occurs in quiescent status, the image forming apparatus 100 transitions to waiting status. Examples of the event E5 are timer events such as disabling energy saving and documents are mounted on ADF etc. and a sensor detecting operation. Also, if a releasing event E6 such as access to HDD occurs in quiescent status, the image forming apparatus 100 transitions to print ready status.

If an event E7 as an internal timer expiration event occurs, the image forming apparatus 100 transitions to engine off status. In engine off status, devices that consume large amounts of power such as the fuser and the charging device are dormant. Contrarily, if an event E8 such as a request to print or receiving a facsimile is received, the image forming apparatus 100 transitions from engine off status to print ready status (panel off). If the event E7 such as expiration of internal timer occurs, the image forming apparatus 100 transitions from engine off status to waiting status. If an event E9 as expiration of internal timer occurs, the image forming apparatus 100 transitions from engine off status to energy saving status. In energy saving status, power is not supplied to components such as the fuser, the charging unit, the control panel, and the HDD in the main system, the CPU is in minimum power consuming status, and data is stored in memory.

If an event E10 such as detecting state of sensors and receiving network access in the main system occurs in energy saving status, the image forming apparatus 100 transitions to print ready status or waiting status after receiving a command to wake up from the sub-system 220. The cause of occurrence of the command to wake up from the sub-system 220 in E10 can be customized.

Figure 4:
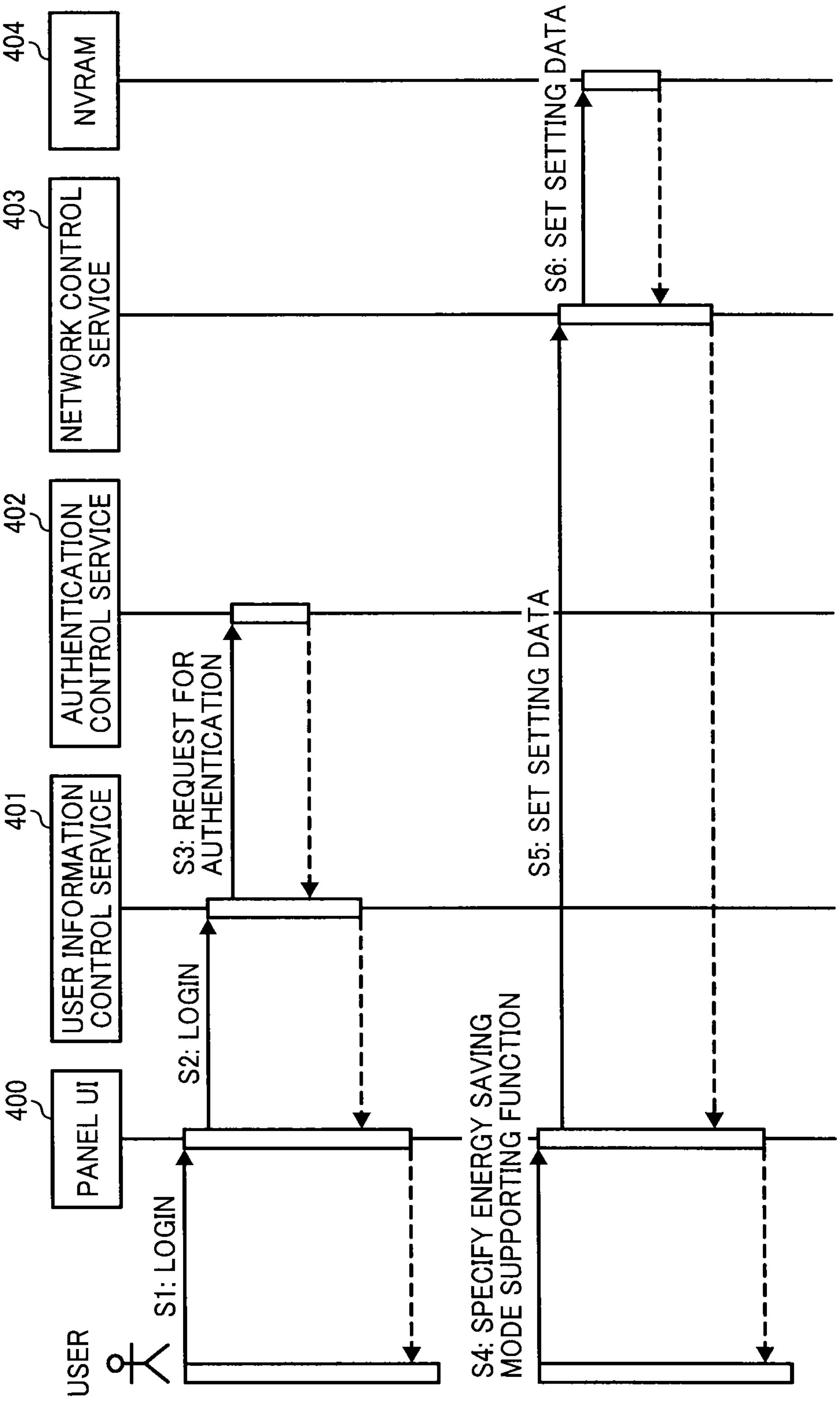
FIG. 4 is a sequence diagram illustrating configuring condition in recovering from energy saving status of the image forming apparatus as an embodiment of the present invention.

FIG. 4 is a sequence diagram illustrating configuring condition in recovering from energy saving status of the image forming apparatus 100. As shown in FIG. 4 log-in to the image forming apparatus 100 is done in S1 and identification data such as user ID and password from a panel user interface (panel UI) 400 are inputted. If the panel UI 400 receives the identification data, the panel UI 400 sends the identification data to a user information control service 401. In S3, the user information control service 401 sends the authentication data to an authentication control service 402 and requests to authenticate the user.

The authentication control service 402 sends the result of authentication to the user information control service 401. Subsequently, the user information control service 401 sends the result of authentication to the panel UI 400 and controls the usage of the image forming apparatus 100 by users. In the following description, it is assumed that the user authentication succeeds. In S4, a function that works in energy saving mode using the panel UI 400 is selected. After receiving input on the function that works in energy saving mode, the panel UI 400 sends the setting to a network control service 403 in S5, and the network control service 403 registers energy saving setting data in NVRAM 404 in S6.

After registering, the NVRAM 404 reports that it finished registering to the network control service 403. Subsequently, the network control service 403 notifies the panel UI of finishing registering, and this transaction to set energy saving mode ends.

Figure 5:
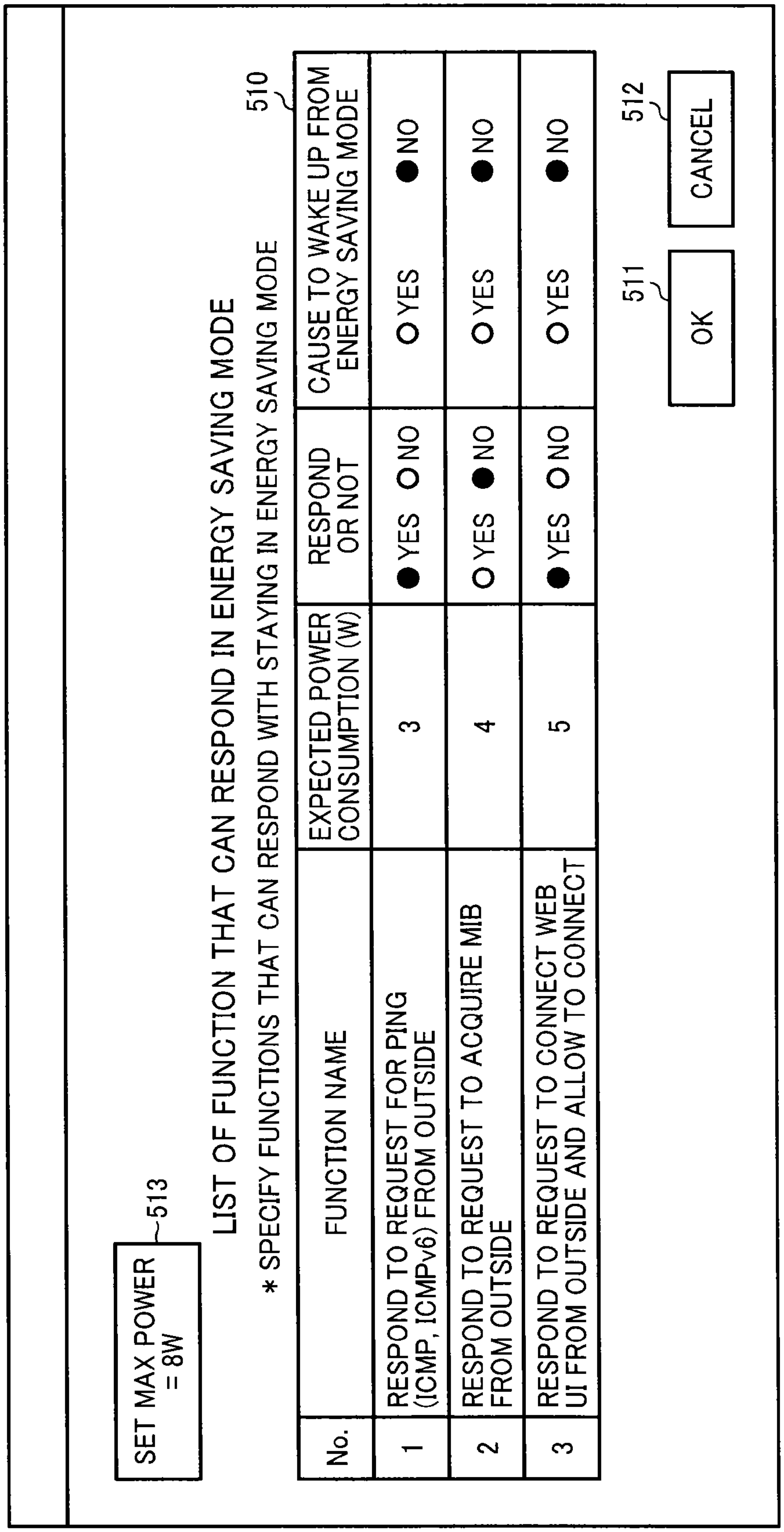
FIG. 5 is a diagram illustrating a configuration screen of energy saving mode that a panel UI displays in S4 in FIG. 4 as an embodiment of the present invention.

FIG. 5 is a diagram illustrating a configuration screen 500 that a panel UI displays in S4 in FIG. 4. On the configuration screen 500, a list 510 that shows a list of functions that operates in energy saving status is displayed. For example, in case of requesting PING in energy saving mode, if a user wants the image forming apparatus 100 to respond to the request without recovering to normal mode, the user selects a radio button "Yes" in column "Respond or not" and a radio button "No" in column "Cause to wake up from energy saving mode".

Also, regarding a request to acquire MIB in SNMP protocol in No. 2, a radio button "No" in column "Respond or not" is selected, and that means that it is not available to respond to request to acquire MIB in SNMP protocol. Regarding request to connect Web UI in No. 3, it is available to respond even in energy saving mode, and this is not cause to wake up from energy saving mode.

Furthermore, the configuration screen 500 includes an input field 513 in which maximum power consumption in energy saving mode can be specified. For example, default setting of 10 W can be set to this field, and a maximum power consumption is input explicitly, a function whose power consumption is close to maximum power consumption is automatically chosen and can be displayed on the configuration screen 500. The maximum power consumption is registered in NVRAM 404 etc. as settings.

To finish this configuration reflecting various settings, the user touches or clicks a button "OK" 511. Otherwise, the user touches or clicks a button "Cancel" 512. Functions that are supposed to work in energy saving mode in the image forming apparatus 100 can be specified with the operation described above. It should be noted that it can be registered in the NVRAM 404 in list 510 format, or it can be registered appropriately in CSV or space delimited format etc. and can be displayed in list format on the panel UI 400.

Figure 6:
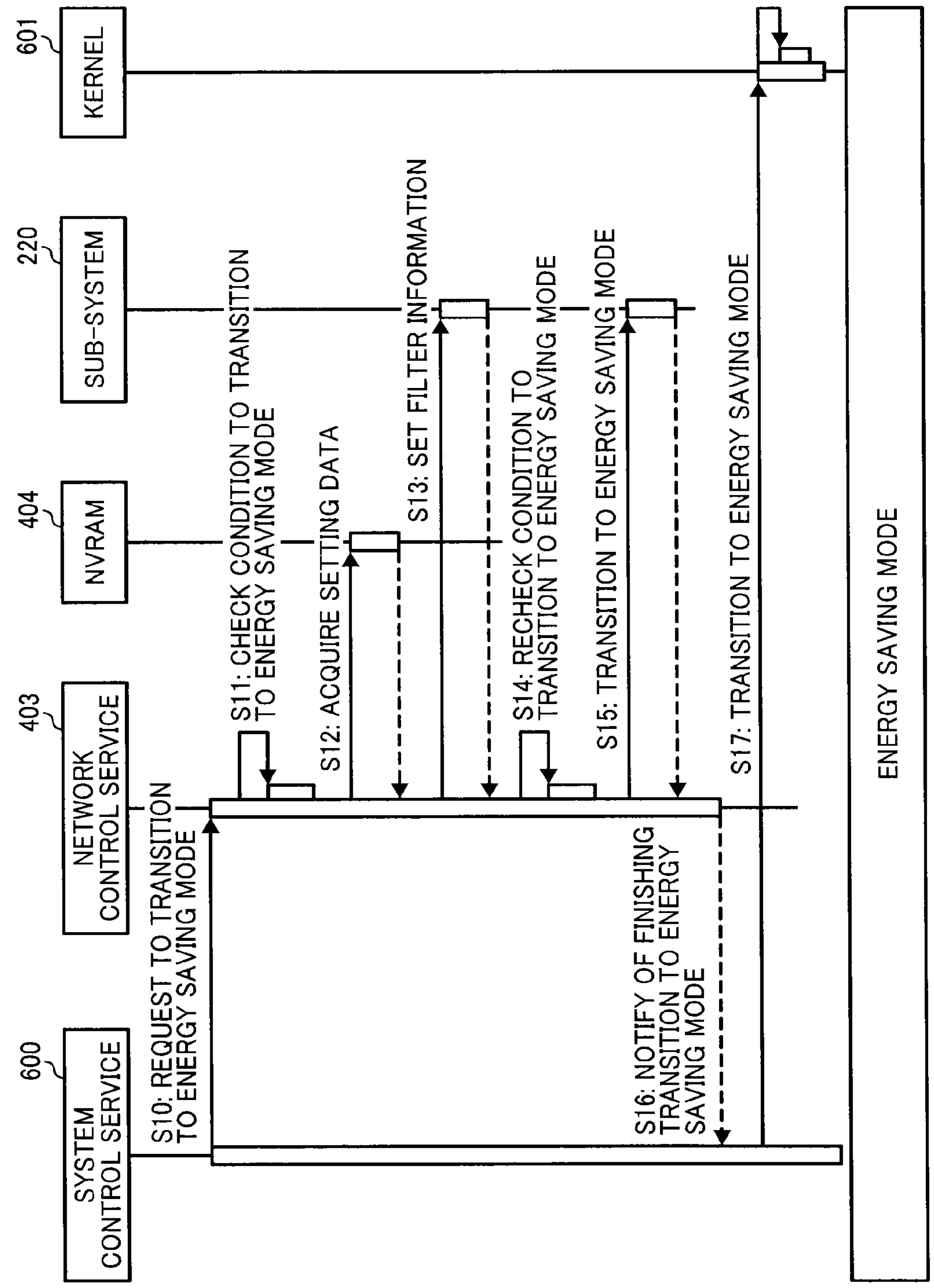
FIG. 6 is a sequence diagram illustrating the image forming apparatus transitions to energy saving mode as an embodiment of the present invention.

FIG. 6 is a sequence diagram illustrating the image forming apparatus 100 transitions to energy saving mode. In FIG. 6, a system control service 600 requests the network control service 403 to transition to energy saving mode in S10. After registering transition to energy saving mode to toggle flag etc., the network control service 403 accesses the NVRAM 404, refers to the list 510 to check settings in transition to energy saving mode in S11, acquires settings in S12, and notifies the network control service 403 of the settings.

Next, the network control service 403 creates filter information that specifies whether or not the image forming apparatus 100 wakes up from energy saving mode based on the setting data and sends the filter information to the sub-system 220 in S13. After storing the filter information in RAM etc., the sub-system 220 notifies the network control service 403 of finishing setting. After checking the toggle flag that indicates that the image forming apparatus 100 is transitioning to energy saving mode in S14, if the network control service 403 determines that status of transitioning to energy saving mode is maintained, the network control service 403 notifies the sub-system 220 of transitioning to energy saving mode in S15.

After receiving the notice from the sub-system 220, the network control service 403 issues a notice of finishing transitioning to energy saving mode to the system control service 600 in S16. The system control service 600 notifies the kernel 601 of starting transitioning to energy saving mode in S17 and makes the image forming apparatus 100 transition to energy saving mode. After transitioning to energy saving mode, the sub-system 220 manages accesses to the image forming apparatus 100 from outside using the filter information.

Figure 7:
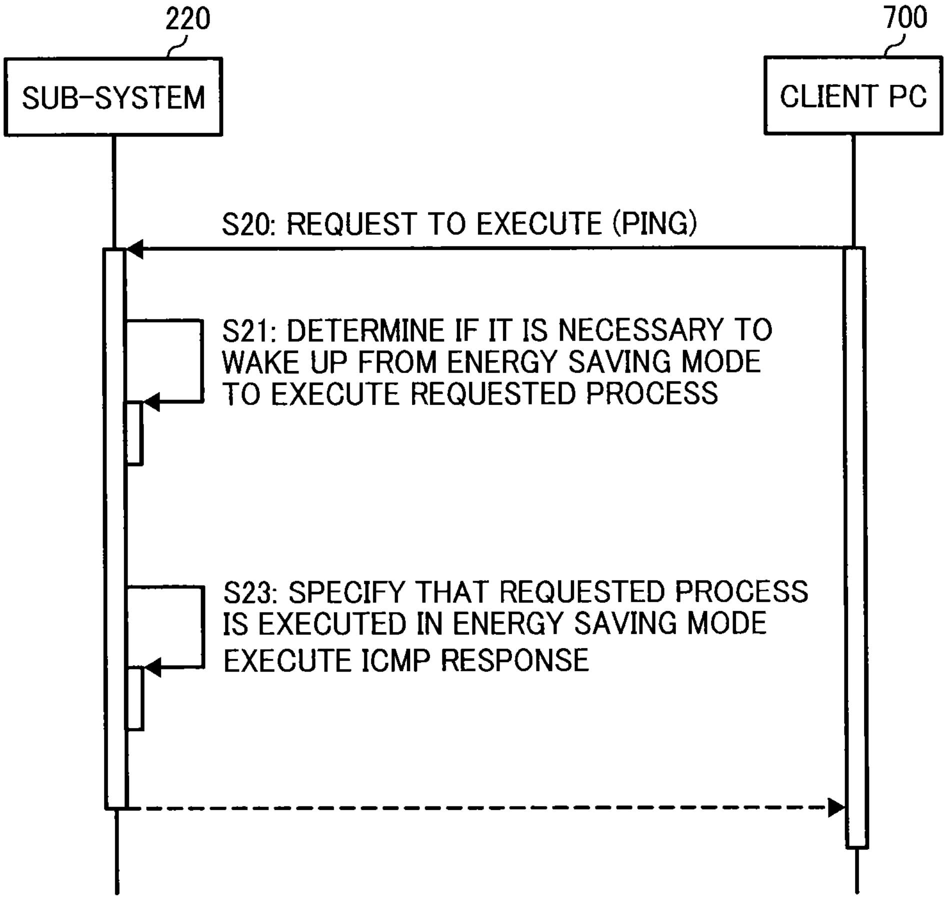
FIG. 7 is a sequence diagram illustrating a transaction between a sub-system and a client as an embodiment of the present invention.

FIG. 7 is a sequence diagram illustrating a transaction between the sub-system 220 and a client PC 700. The client PC 700 requests the image forming apparatus to execute PING in S20. After receiving the request, the sub-system 220 determines whether or not it is necessary to wake up from energy saving mode in order to process the request referring to the filter information in S21.

In this case, the client PC 700 sends PING to the image forming apparatus 100, so the sub-system 220 creates ICMP response with maintaining energy saving mode and sends the ICMP response back to the client PC 700. As described above, the image forming apparatus 100 can determine processes available to respond with maintaining energy saving mode, and that can balance merit of demanding energy saving against demerit of decreasing processing capability.

Figure 8:
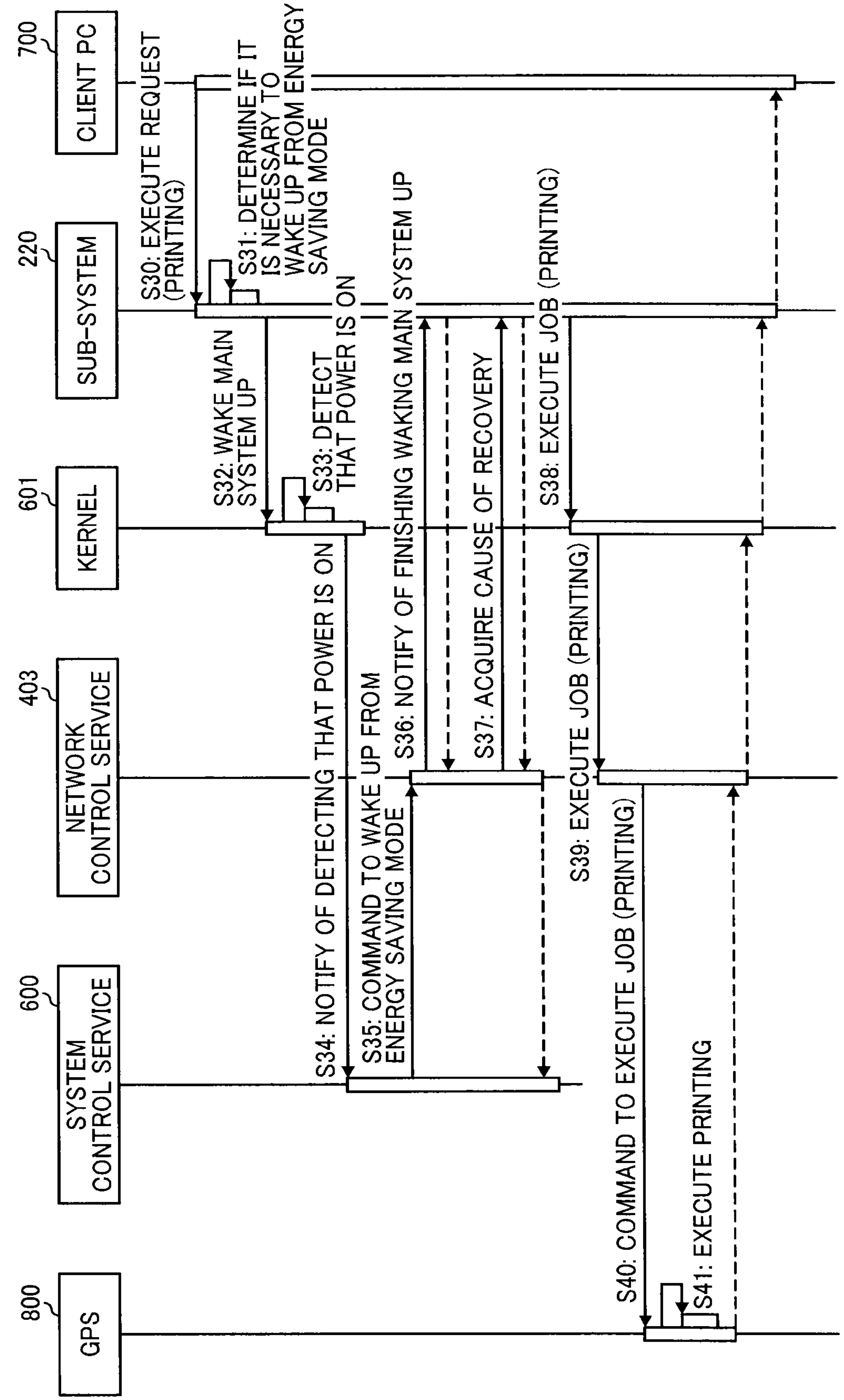
FIG. 8 is a diagram illustrating a process in which the client issues a request to print as an embodiment of the present invention.

FIG. 8 is a diagram illustrating a process in which the client PC 700 issues a request to print. After the client PC 700 issues a request to print in S30, the sub-system 220 determines whether or not it is necessary to wake up from energy saving mode in S31. In this case, the sub-system 220 determines that it is necessary to wake up from energy saving mode. Subsequently, the sub-system 220 notifies the kernel 601 of a command to wake the main system up in S32.

After receiving the command from the sub-system 220, the kernel 601 detects that the power is on in S33 and notifies the system control service 600 of detecting that the power is on. After receiving the notice, the system control service 600 requests the network control service 403 to wake up from energy saving mode in S35. The network control service 403 notifies the sub-system 220 of finishing waking the main system up in S36, acquires the cause of recovery to create a log etc., and sends the cause of recovery to the system control service 600 in S37.

The sub-system 220 requests the kernel 601 to execute a job (printing) in S38, and the kernel 601 requests the network control service to execute the job (printing) in S39. Subsequently, the network control service 403 requests a Graphic Plot Service (GPS) 800 to execute the job (printing). The process ends after the GPS 800 executes printing and notifies the client PC 700 of status of printing in S41.

Figure 9:
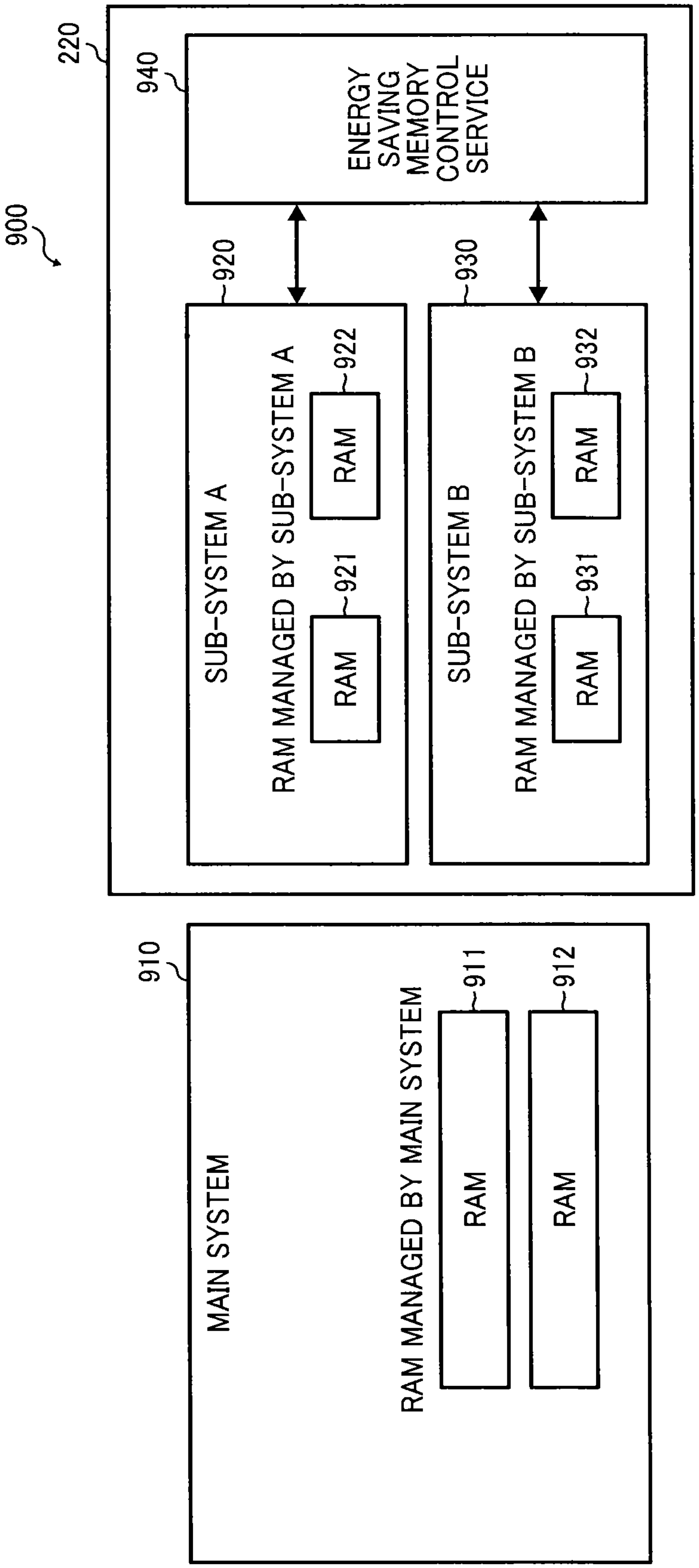
FIG. 9 is a diagram illustrating memory allocation of a main system and the sub-system as an embodiment of the present invention.

FIG. 9 is a diagram illustrating memory allocation 900 of the main system and the sub-systems. The main system 910 includes RAM 911 and 912 as storage units. The sub-system A 920 includes RAM 921 and 922 as storage units, and the sub-system B 930 includes RAM 931 and 932. In normal mode, the RAM 911 and 912 can be processed with enough power supply. Contrarily, it is necessary that the sub-systems 920 and 930 process accesses within limited power consumption in energy saving mode. Also, RAM has a tendency to increase power consumption depending on its storage capability. Therefore, the sub-systems 920 and 930 balance maximization of power consumption with providing functions by optimizing usage efficiency of memory in energy saving mode.

To achieve this purpose, the sub-system 220 is equipped with an energy saving memory control service 940. It should be noted that the energy saving memory control service 940 can be an internal module of the sub-system 220 or can be implemented as another module that operates specifically in energy saving mode. The energy saving memory control service 940 includes a table that registers capacity of RAM 921, 922, 931, and 932 in the sub-system 220 and a monitor that monitors memory usage. In FIG. 9, in case of increasing memory capacity as RAM 921<RAM 922<RAM 931<RAM 932 in ascending order, after receiving an external access, the sub-system 220 use the RAM 921 whose capacity is small as default to minimize power consumption in energy saving mode.

However, external accesses in energy saving mode include not only PING response and filtering processes such as SNMP but also requesting web access using the image forming apparatus 100 as gateway server. In this case, only the RAM 921 with the minimum capacity cannot handle a situation such as the downloading of a large file. Therefore, the energy saving memory control service 940 controls the number of RAM to be active in response to memory usage in a preferable embodiment. In another embodiment, the energy saving memory control service 940 uses RAM whose capacity are the same and allocates memory increasing or decreasing the number of RAM to be active in response to memory usage.

Figure 10:
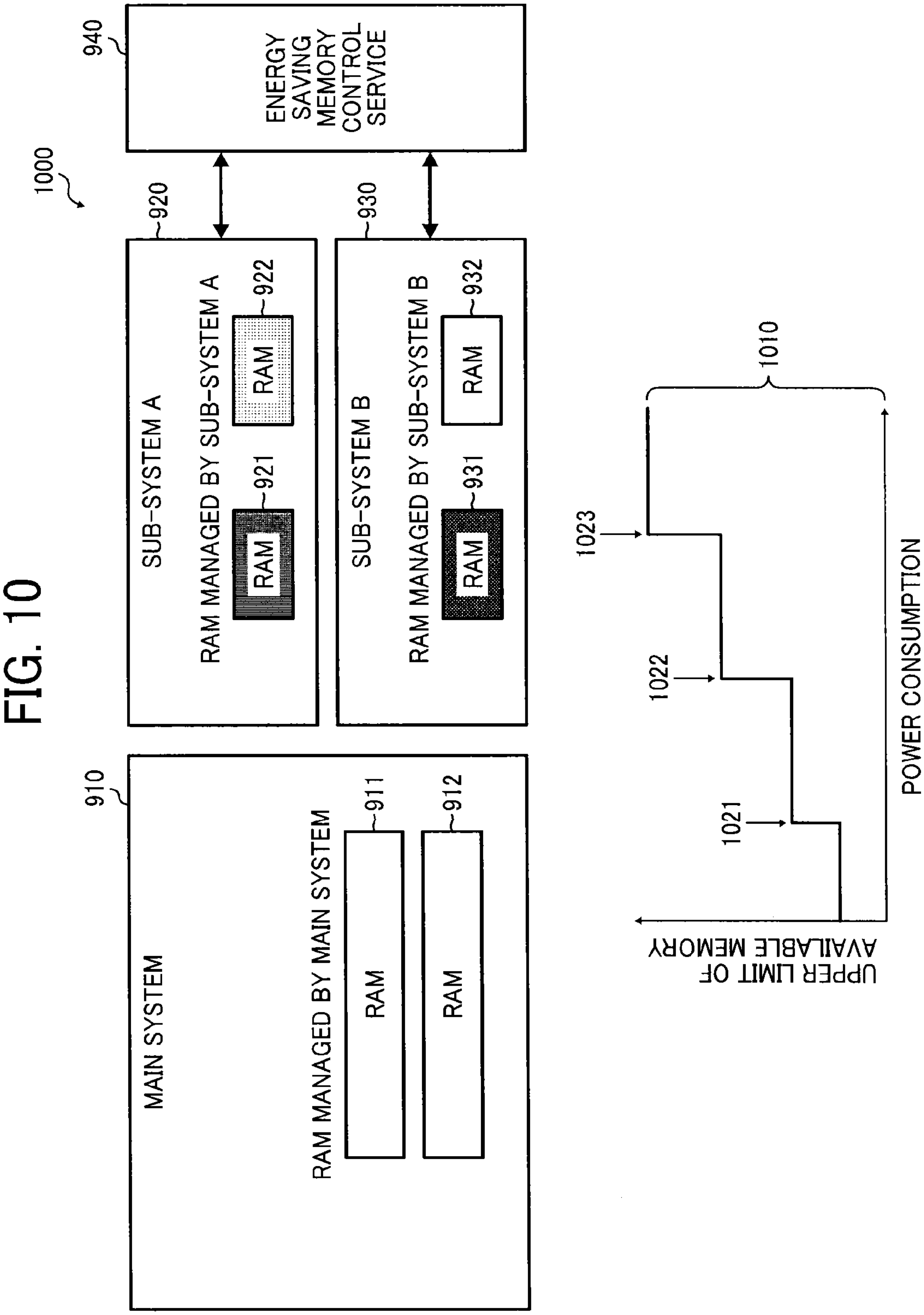
FIG. 10 is a diagram illustrating memory control that an energy saving memory control service executes as an embodiment of the present invention.

FIG. 10 is a diagram illustrating memory control 1000 that the energy saving memory control service 940 executes. The energy saving memory control service 940 uses the RAM 921 with the minimum capacity as default in energy saving mode. After receiving an external access and the RAM 921 starts processing, the energy saving memory control service 940 starts monitoring memory usage of the RAM 921. If memory usage of the RAM 921 exceeds the set upper limit, e.g. 80%, the energy saving memory control service 940 supplies power to the RAM 922 in addition to the RAM 921 and modifies memory allocation to use both of them. Therefore, although power consumption in energy saving mode increases for the amount of the RAM 922, loss of processing results due to memory overflow can be avoided in case only the RAM 921 cannot handle the situation.

Furthermore, if the usage ratio of the RAM 921 and the RAM 922 exceeds the set upper limit, the energy saving memory control service 940 starts using the RAM 931 to balance process type in energy saving mode, consumption power control in energy saving mode, and processing efficiency. FIG. 10 also illustrates the relationship between memory allocation by the energy saving memory control service 940 and power consumption. In FIG. 10, the RAM 921 is used as default, and if usage ratio of the RAM 921 exceeds the set upper limit, power is supplied to the RAM 922 as backup (1021). Also, if usage ratio of the RAM 921 and the RAM 922 exceeds the set upper limit, the RAM 931 gets activated as backup (1022). Although power consumption increases as number of active RAM, i.e., memory capacity increases, that can expand the type of supportable processes in energy saving mode and prevent loss of processing results due to memory overflow.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image forming apparatus having a normal mode supplying power for all functions of the image forming apparatus and an energy saving mode in which power is supplied to fewer than all parts of the image forming apparatus, comprising:

processing circuitry implementing a management unit to manage user modifiable settings for functions supported in the energy saving mode, the user modifiable settings defining when the image forming apparatus remains in the energy saving mode and when the image forming apparatus returns to the normal mode in response to receiving an external access request by associating functions with one of the energy saving mode and the normal mode, the user modifiable settings being defined for the image forming apparatus before receiving the external access request, and a filtering unit to filter external access to the image forming apparatus in the energy saving mode based on the user modifiable settings and to determine, based on the user modifiable settings, whether the image forming apparatus remains in the energy saving mode or returns to the normal mode in order to process the access, wherein external access to the image forming apparatus corresponds to the external access request received via a network; and wherein the user modifiable settings include an option to toggle whether a request for a particular function will be ignored in the energy saving mode and an option to toggle whether the image forming apparatus remains in the energy saving mode or returns to the normal mode in response to the request for the particular function.

2. The image forming apparatus according to claim 1, wherein the processing circuitry further implements a specifying unit configured to:

specify maximum power consumed in the energy saving mode; and select one or more functions that are able to operate within the specified maximum power, wherein the one or more functions are displayed on a configuration screen.

3. The image forming apparatus according to claim 1, wherein the processing circuitry further implements a monitoring unit to monitor usage rate of a storage unit while transitioning to the energy saving mode, wherein the image forming apparatus modifies memory allocation in the storage unit in response to usage rate of the storage unit in the energy saving mode.

4. The image forming apparatus according to claim 3, wherein the storage unit comprises a plurality of storage units in various memory sizes, and the image forming apparatus modifies memory allocation to supply power to additional storage units in case usage rate of a default storage unit exceeds its maximum in the energy saving mode.

5. The image forming apparatus according to claim 4, wherein the default storage unit has a minimum size among the plurality of storage units, and usage efficiency and process efficiency of the storage unit in the energy saving mode can be modified by allocating memory.

6. A method of controlling saving energy in an image forming apparatus having a normal mode supplying power to all functions of the image forming apparatus and an energy saving mode in which power is supplied to fewer than all parts of the image forming apparatus, comprising:

managing, using processing circuitry, user modifiable settings for functions supported in the energy saving mode, the user modifiable settings defining when the image forming apparatus remains in the energy saving mode and when the image forming apparatus returns to the normal mode in response to receiving an external access request by associating functions with one of the energy saving mode and the normal mode, the user modifiable settings being defined for the image forming apparatus before receiving the external access request; and filtering, using the processing circuitry, external access to the image forming apparatus in the energy saving mode based on the user modifiable settings and determining, based on the user modifiable settings, whether the image forming apparatus remains in the energy saving mode or returns to the normal mode in order to process the access, wherein external access to the image forming apparatus corresponds to the external access request received via a network; and wherein the user modifiable settings include an option to toggle whether a request for a particular function will be ignored in the energy saving mode and an option to toggle whether the image forming apparatus remains in the energy saving mode or returns to the normal mode in response to the request for the particular function.

7. The method of controlling saving energy according to claim 6, wherein the method further comprises:

receiving a specified maximum power consumed in the energy saving mode;

selecting one or more functions that are able to operate within the specified maximum power; and displaying the one or more functions on a configuration screen.

8. The method of controlling saving energy according to claim 6, further comprising the steps of:

monitoring usage rate of a storage unit while transitioning to the energy saving mode; and modifying memory allocation in the storage unit in response to usage rate of the storage unit in the energy saving mode.

9. A non-transitory computer-readable medium storing a program that, when executed by a computer, causes the computer to implement a method of outputting an image, the method comprising:

managing user modifiable settings for functions supported in an energy saving mode, the user modifiable settings defining when an image forming apparatus remains in the energy saving mode and when the image forming apparatus returns to the normal mode in response to receiving an external access request by associating functions with one of the energy saving mode and the normal mode, the user modifiable settings being defined for the image forming apparatus before receiving the external access request; and filtering external access to an image forming apparatus in the energy saving mode based on the user modifiable settings and determining, based on the user modifiable settings, whether the image forming apparatus remains in the energy saving mode or returns to a normal mode in order to process the access, wherein external access to the image forming apparatus corresponds to the external access request received via a network; and wherein the user modifiable settings include an option to toggle whether a request for a particular function will be ignored in the energy saving mode and an option to toggle whether the image forming apparatus remains in the energy saving mode or returns to the normal mode in response to the request for the particular function.

* * * * *